US008202583B2

(12) United States Patent
Kobayashi et al.

(10) Patent No.: US 8,202,583 B2
(45) Date of Patent: Jun. 19, 2012

(54) METHOD OF MANUFACTURING NOZZLE PLATE

(75) Inventors: Yasunori Kobayashi, Gifu (JP); Yasuo Okawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 912 days.

(21) Appl. No.: 12/054,863

(22) Filed: Mar. 25, 2008

(65) Prior Publication Data

US 2008/0260961 A1 Oct. 23, 2008

(30) Foreign Application Priority Data

Mar. 27, 2007 (JP) ................................ 2007-082328

(51) Int. Cl.
*C08F 2/46* (2006.01)

(52) U.S. Cl. ........................................................ 427/487

(58) Field of Classification Search ................... 427/487
See application file for complete search history.

(56) References Cited

U.S. PATENT DOCUMENTS

| | | | |
|---|---|---|---|
| 5,863,371 | A | 1/1999 | Takemoto et al. |
| 6,390,599 | B1 | 5/2002 | Takemoto et al. |
| 2006/0137180 | A1 | 6/2006 | Ito et al. |

FOREIGN PATENT DOCUMENTS

| | | | | |
|---|---|---|---|---|
| CN | 1579778 | A | | 2/2005 |
| JP | H04-235048 | | | 8/1992 |
| JP | 05345419 | A | * | 12/1993 |
| JP | 06246921 | | * | 9/1994 |
| JP | H06-246921 | | | 9/1994 |
| JP | H11-320893 | A | | 11/1999 |
| JP | 2002-001966 | | | 1/2002 |
| JP | 2002-355957 | A | | 12/2002 |
| JP | 2006-181796 | | | 7/2006 |
| JP | 2006-256282 | A | | 9/2006 |
| JP | h04-176657 | A | | 5/2009 |

OTHER PUBLICATIONS

The State Intellectual Property Office of the People's Republic of China; Notification of First Office Action in Chinese Patent Application No. 200810087432.5 mailed Aug. 21, 2009.

Japan Patent Office, Notice of Reasons for Rejection in Japanese Patent Application No. 2007-082328 mailed Jan. 27, 2009. (partial translation).

* cited by examiner

*Primary Examiner* — Elena T Lightfoot
(74) *Attorney, Agent, or Firm* — Baker Botts L.L.P.

(57) ABSTRACT

A method of manufacturing a nozzle plate including: a step for forming the nozzle hole on a plate to become the nozzle plate; a first photocurable resin injection step for (i) coating with a photocurable resin a first surface of the plate and (ii) injecting the photocurable resin into an area inside the nozzle hole; a first curing step for applying light to the plate, so as to form a first cured resin part including a columnar part and an annular part; a first uncured resin removing step for removing an uncured portion of the photocurable resin; a base film formation step for forming a base film on the first surface; a cured resin removing step for removing the first cured resin part; and a water-repellent film formation step for coating with a water-repellent film a surface of the base film and a portion of the first surface of the plate exposed from the base film.

3 Claims, 4 Drawing Sheets

METHOD OF MANUFACTURING NOZZLE PLATE

CROSS REFERENCE TO RELATED APPLICATION

The present application claims priority from Japanese Patent Application No. 2007-82328, which was filed on Mar. 27, 2007, the disclosure of which is herein incorporated by reference in its entirety.

BACKGROUND OF THE INVENTION

1. Field of the Invention

The present invention relates to a method of manufacturing a nozzle plate for a liquid ejecting head such as an inkjet head.

2. Description of Related Art

An ejection surface of a nozzle plate having thereon nozzles for ejecting droplets are sometimes provided with a water-repellent film. This water-repellent film is for restraining variation in an amount of a droplet ejected, and for restraining a flight direction of the droplet from curving. Japanese Unexamined Patent Publication No. 355957/2002 (Tokukai 2002-355957) discloses an inkjet head having an orifice plate serving as a nozzle plate whose ejection surface has thereon a first ink-repellent film and a second ink-repellent film thicker than the first-ink repellent film. The first ink-repellent film is formed closer to a nozzle opening than the second ink-repellent film is to the same. That is, two ink-repellent films respectively having different thicknesses are formed so as to create different levels around the nozzle opening. The first ink-repellent film exhibits higher ink-repellency than the second ink-repellent film. Therefore, ink adhered to the first ink-repellent film is attracted to the second ink-repellent film, thus enabling stable ejection of any type of ink.

The above mentioned Tokukai 2002-355957 describes the two types of ink-repellent films that are formed as follows. First, a photoresist is patterned on the ejection surface of the orifice plate so as to form a pattern of the second ink-repellent film. In this step, the photoresist is applied throughout the entire ejection surface. The photoresist is then exposed, using a photomask having the pattern of the second ink-repellent film, and is subjected to development thereafter. Next, the first ink-repellent film is formed on a part of the orifice plate without the photoresist, using the pattern of the photoresist as a mask. After the photoresist is removed, the second ink-repellent film is formed. Since the first ink-repellent film is a nonconductor, the second ink-repellent film is not formed on the first ink repellent film. Finally, oxygen plasma is applied to the back surface of the ejection surface to remove the first ink-repellent film, made of an organic material, except on the ejection surface.

The above method requires that a photomask having a pattern be manufactured beforehand to form the two different types of ink-repellent films respectively having different thicknesses on a nozzle plate. However, manufacturing of a photomask takes a lot of work and time, and thus contributes to an increase in the production cost of the nozzle plate. Further, when manufacturing a plurality of types of nozzle plates whose respective positions of different levels formed around their ejection openings are different, photomasks for each type of the nozzle plate must be manufactured. Thus, the above method is not suitable for manufacturing a plurality of types of nozzle plates.

SUMMARY OF THE INVENTION

An object of the present invention is to provide a nozzle plate manufacturing method which enables manufacturing of a nozzle plate with different levels formed around an ejection opening of the nozzle plate, without a particular need of a member which requires a lot of work and time to be manufactured.

A method of manufacturing a nozzle plate having thereon a nozzle hole for ejecting a liquid, includes: a step for forming the nozzle hole on a plate to become the nozzle plate; a first photocurable resin injection step; a first curing step; a first uncured resin removing step; a base film formation step; a cured resin removing step; and a water-repellent film formation step. The nozzle hole penetrates the plate in the thickness direction. In the first photocurable resin injection step, a photocurable resin is applied to coat a first surface of the plate on which a first opening to serve as an ejection opening of the nozzle hole is formed. Further, the photocurable resin is injected into an area inside the nozzle hole which area continuously leads to the first opening. In the first curing step, light is applied to the plate in a direction from (i) a second surface provided with a second opening of the nozzle hole to (ii) the first surface, so as to form a first cured resin part including: a columnar part which is a cured portion of the photocurable resin within an area that overlaps the first opening along the direction from the second surface to the first surface; and an annular part which is a cured portion of the photocurable resin surrounding a part of the columnar part outside the nozzle hole. In the first uncured resin removing step which is performed after first curing step, an uncured portion of the photocurable resin on the first surface is removed. In the base film formation step which is performed after the first uncured resin removing step, a base film is formed on the first surface in such a manner that the base film contacts and surrounds the annular part of the first cured resin part. In the cured resin removing step which is performed after the base film formation step, the first cured resin part is removed. In the water-repellent film formation step performed after the cured resin removing step, a water-repellent film is formed to coat a surface of the base film and a portion of the first surface of the plate exposed from the base film.

In the present invention, photocurable resin is subjected to an overexposure, so as to form the first cured resin part including the columnar part and the annular part. With this method, it is possible to form a nozzle plate having different levels around the ejection opening of the nozzle plate, without a particular need of separately preparing a photomask which requires a lot of work and time to be manufactured.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

<Embodiment 1>

Figure 1:
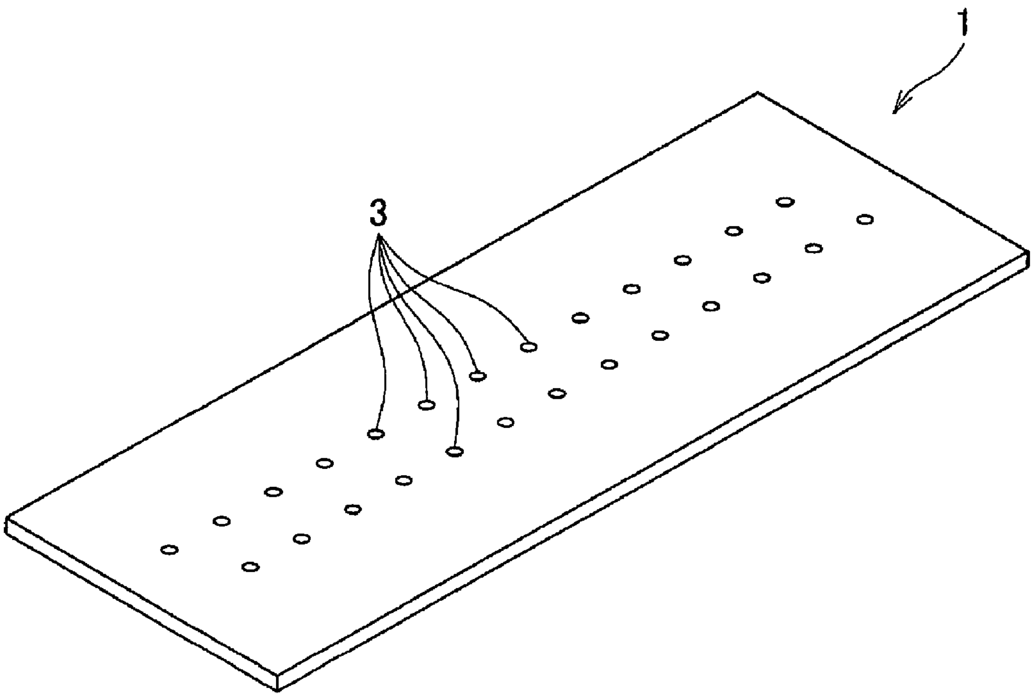
FIG. 1 is a perspective diagram of a nozzle plate manufactured according to Embodiment 1 of the present invention.

FIG. 1 is a perspective diagram of a nozzle plate manufactured according to Embodiment 1 of the present invention.

FIG. 1 shows a nozzle plate 1 which is a stainless-made plate of approximately 50 μm to 100 μm in thickness. This nozzle plate 1 has a plurality of nozzle holes 3 formed through the nozzle plate in the thickness direction.

Figure 2:
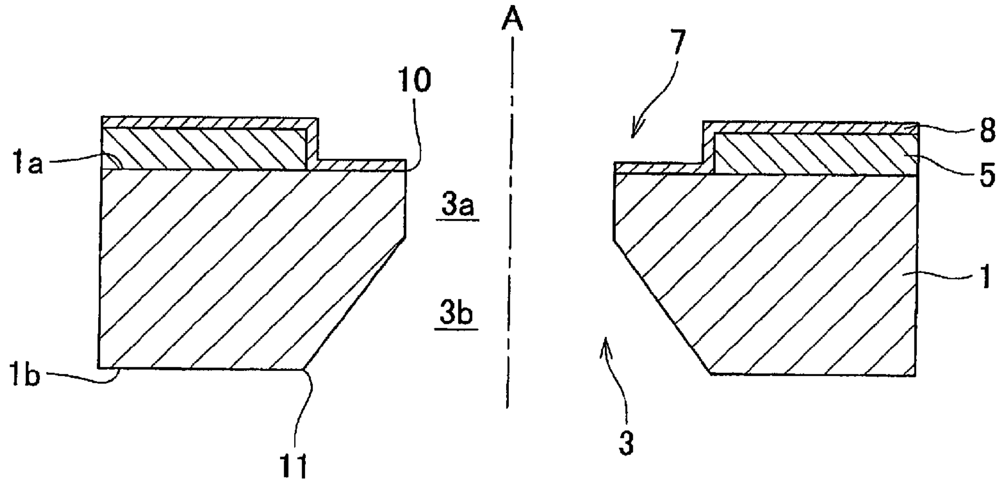
FIG. 2 is a length-wise cross sectional view providing an enlarged view of a part including a nozzle hole of the nozzle plate shown in FIG. 1.

FIG. 2 is a length-wise cross sectional view providing an enlarged view of a part including one of the nozzle holes 3 of the nozzle plate 1 shown in FIG. 1. In FIG. 2, the nozzle plate 1 is positioned so that a direction from the bottom to the top of the figure is the direction toward which a droplet is ejected. As shown in FIG. 2, the nozzle hole 3 is a through hole formed through (i) an ejection opening 10 as a first opening formed on the ejection surface 1*a* as a first surface of the nozzle plate 1 to (ii) an inflow opening 11 as a second opening formed on a connecting surface 1*b* as a second surface on the other side of the ejection surface 1*a*. The nozzle hole 3 is symmetrical relative to a center axis A. The nozzle hole 3 has a cylindrical part 3*a* and a truncated cone part 3*b*. The cylindrical part 3*a* has the ejection opening 10 at one of its end and continuously leads to the ejection surface 1*a*. The truncated cone part 3*b* has the inflow opening 11 at one of its end, and continuously leads to the connection plane 1*b*. The top part of the truncated cone part 3*b* has the same diameter as that of the cylindrical part 3*a*.

The ejection surface 1*a* of the nozzle plate 1 is coated with a nickel plating film 5 which is a base film of approximately 1 μm to 1 μm in thickness. This nickel plating film 5 contains no fluorine-based polymer material. On the nickel plating film 5, a through hole 7 having a larger diameter than the ejection opening 10 is formed. The center axis of the through hole 7 matches with the center axis A of the nozzle hole 3. Accordingly, a circumferential area of the ejection opening 10 on the ejection surface 1*a* is not coated with the nickel plating film 5 and is exposed from the nickel plating film 5.

The surface (i.e., the top and side surfaces) of the nickel plating film 5 and the area of the ejection surface 1*a* exposed from the nickel plating film 5 are coated with a film containing a water-repellent component such as a fluorine-based resin, a silicon-based resin, or the like. In the present embodiment, these surfaces are coated with a water-repellent film 8 of approximately 10 nm in thickness which contains polytetrafluoro-ethylene (PTFE). The ejection surface 1*a* is coated with the water-repellent film 8 which covers to the edge of the ejection opening 10. The water-repellent film 8 of the present embodiment does not overhang the ejection opening 10. Therefore, the diameter of the opening on the water-repellent film 8 is the same as that of the ejection opening 10.

Thus, the nozzle hole 3 of the nozzle plate 1 leads to the through hole 7 whose diameter is larger than the nozzle hole 3, as shown in FIG. 2. Therefore, the ejection opening 10 is positioned on a bottom surface of a recessed part defined by the through hole 7. Further, a part of the water-repellent film 8 formed on the circumferential area of the ejection opening 10 on the ejection surface 1*a* is lower than the top surface of the nickel plating film 8. In short, different levels are created around the ejection opening 10. Thus, when the water-repellent film 8 is wiped by a wiper during maintenance of an inkjet head having the nozzle plate 1, a foreign material carried by the wiper is more likely to be captured nearby a corner formed at the boundary between the top and side surfaces of the nickel plating film 5, instead of being captured nearby the ejection opening 10. This prevents the foreign material from interfering an ink droplet ejected from the nozzle hole 3, and thereby contributes to equalization of the ink ejection characteristic. In addition, since the water-repellent film 8 formed on the circumferential area of the ejection opening 10 is hardly worn by the wiping operation using the wiper, it is possible to achieve a longer life of the nozzle plate 1.

Next, the following describes, with reference to FIG. 3A to FIG. 3G, a method of manufacturing the nozzle plate 1 shown in FIG. 1 and FIG. 2. FIGS. 3A to 3G are cross sectional views sequentially showing the steps of the method of manufacturing the nozzle plate 1. As is obvious from the above description, the nickel plating film 5 and the water-repellent film 8 are significantly thinner than the nozzle plate 1. Therefore, the nozzle plate 1 with the nickel plating film 5 and the water-repellent film 8 is also collectively referred to as nozzle plate in this specification.

Figure 3A:
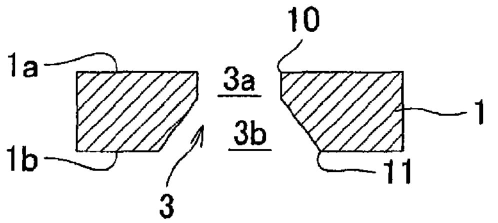
FIGS. 3A to 3G are cross sectional views sequentially showing the steps of a method of manufacturing the nozzle plate shown in FIG. 1.

First, as shown in FIG. 3A, a nozzle hole 3 is formed on a nozzle plate 1 through two different pressing steps: a pressing step for forming a truncated cone part 3*b*; and another pressing step for forming a cylindrical part 3*a*. The pressing is performed in a pressing direction from the connection plane 1*b* to the ejection surface 1*a*. The pressing will create projected parts such as flush on the ejection surface 1. However, these projected parts are removed through grinding and polishing processes. Note that the nozzle hole 3 can be formed by means of etching process.

Figure 3B:
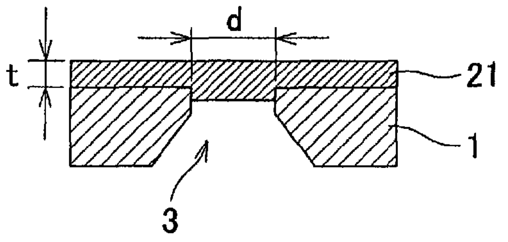

Next, as shown in FIG. 3B, a film of photocurable resin 21 serving as a resist is press fit, while applying a heat, on to the ejection surface 1*a* of the nozzle plate 1. Then, the heating temperature, pressure, and roller speed are adjusted, and a predetermined amount of the photocurable resin 21 is injected into the cylindrical part 3*a* which is the leading end part of the nozzle hole 3 (first photocurable resin injection step). Here, too high a heating temperature at the time of press fitting; e.g., a temperature largely surpassing the glass transition point, will cause the photocurable resin 21 to exhibit higher fluidity, and consequently makes it extremely difficult to coat the ejection surface 1*a* with the photocurable resin 21 having a necessary film thickness (e.g., approximately 5 to 15 μm). On the contrary, too low a heating temperature will not softens the film, and a necessary amount of the photocurable resin cannot be injected to the cylindrical part 3. In view of this, for example, the heating temperature is set at a temperature of the glass transition point or higher whereby the photocurable resin 21 exhibits a rubber-like characteristic. Specifically, the heating temperature is preferably a temperature that falls within a range of 80° C. to 100° C. However, the heating temperature is not limited to this. Further, to inject the necessary amount of the photocurable resin 21 to the cylindrical part 3*a*, it is preferable that the thickness t of the film-like photocurable resin 21 be not more than the diameter d of the cylindrical part 3*a*.

Figure 3C:
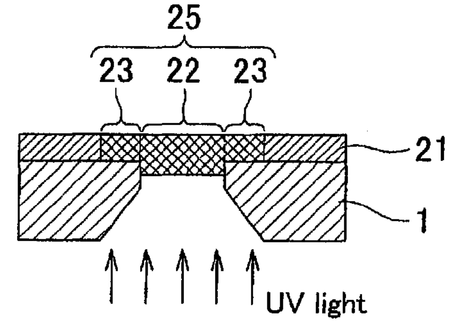

Next, as shown in FIG. 3C, ultraviolet (UV) light is applied to the nozzle plate 1 in a direction from the connection plane 1*b* to the ejection surface 1*a*, thereby partially curing the photocurable resin 21 (first curing step). In this step, there is cured the photocurable resin 21 within an area that overlaps the cylindrical part 3*a* of the nozzle hole 3 in the axial direction of the nozzle hole 3; i.e., the photocurable resin 21 within an area that overlaps the ejection opening 10. Specifically, a portion of the photocurable resin 21 within an area extended from above the cylindrical part 3*a* to the inside of the cylindrical part 3*a* over the ejection surface 1*a* is cured so as to form a cylindrical columnar part 22.

In the present embodiment, the irradiation of the UV light is continued even after the formation of the columnar part 22; i.e., so-called overexposure is performed, so as to also cure a portion of the photocurable resin 21 annularly surrounding the part of the columnar part 22 protruding from the ejection surface 1*a*. As the result, there is formed an annular part 23 which is a cured portion of the photocurable resin 21 in the area outside the nozzle hole 3, surrounding the columnar part 22. In other words, a cured resin part 25 including the columnar part 22 and the annular part 23 is formed in the photocurable resin 21, by means of exposure to the UV light. The outer diameter of the annular part 23 varies according to the amount of the UV light applied to the nozzle plate 1. However, the amount of the UV light used for the exposure can be adjusted with high-accuracy. Therefore, the diameter of the annular part 22 can be adjusted with high-accuracy according to the amount of the UV light applied thereto.

Figure 3D:
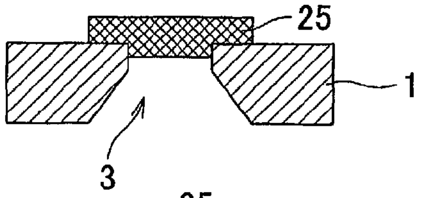

Next, as shown in FIG. 3D, the uncured photocurable resin 21 on the ejection surface 1*a* of the nozzle plate 1 is removed with a developing liquid; e.g., an alkali developing liquid containing a 1% $Na_2CO_3$ solution (first uncured resin removing step). Thus, only the cured resin part 25 remains on the nozzle plate 1.

Figure 3E:
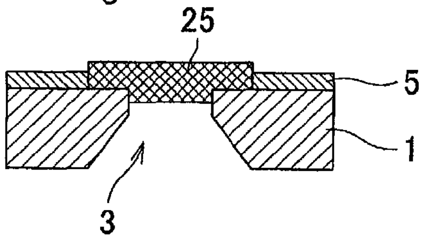

Subsequently, as shown in FIG. 3E, a nickel plating film 5 is formed on the ejection surface 1*a* of the nozzle plate 1 having thereon the cured resin part 25 (base film formation step). The nickel plating film 5 may be formed either by means of an electrolytic plating method or an electroless plating method. Since the cured resin part 25 is a non-metal substance, it is difficult to form the nickel plating film 5 on the cured resin part 25. When an electrolytic plating method is adopted to form the nickel plating film 5, the nickel plating film 5 selectively grows on the nozzle plate 1. On the other hand, when an electroless plating method is adopted to form the nickel plating film 5, the nickel plating film 5 may grow on the cured resin part 25 as well. However, the plating film 5 on the cured resin part 25 is removed along with the cured resin part 25 in a cured resin removing step which is hereinafter detailed. Note that the plating film is not limited to the nickel plating film, and the plating film may be chrome plating film, copper plating film, or the like plating film. Alternatively, the plating film may include a plurality of plating films.

Figure 3F:
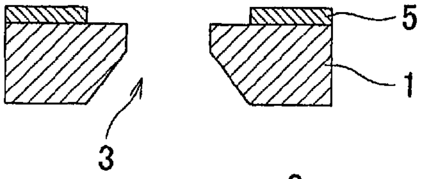

Subsequently, as shown in FIG. 3F, a peeling liquid which is a 3% NaOH solution is used to dissolve the cured resin part 25, and to remove the same from the nozzle plate 1 (cured resin removing step).

Figure 3G:
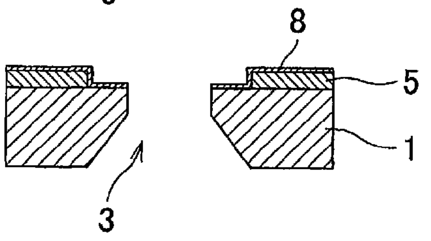

Next, as shown in FIG. 3G, a water-repellent film 8 is formed by means of Physical Vapor Deposition (PVD) method, on the surface (top and side surfaces) of the nickel plating film 5 and the area of the ejection surface 1*a* exposed from the nickel plating film 5 (water-repellent film formation step). Thus, a nozzle plate as shown in FIG. 1 and FIG. 2 having different levels formed around the ejection opening 10 is completed. Note that the water-repellent film 8 is formed under a high vacuum environment. Therefore, the particles constituting the water-repellent film 8 travel very straight in the vacuum environment from a vapor source and adhere to the surface of the nozzle plate 1. For this reason, the water-repellent film 8 is hardly formed inside the nozzle hole 3. It is also possible to form the water-repellent film 8 by means of a vapor deposition method other than PVD.

According to the present embodiment, the cured resin part 25 including the columnar part 22 and the annular part 23 are formed through the overexposure of the photocurable resin 21. This allows manufacturing of a nozzle plate having different levels around the ejection opening 10 thereof, without a need of separately preparing a member such as a photomask which takes a lot of work and time to be manufactured.

Further, the water-repellent film 8 is formed by means of the PVD method. This makes it easy to selectively form the water-repellent film 8 on the surface of the nozzle plate 1.

Further, the present embodiment allows highly accurate adjustment of the diameter of the annular part 22 of the cured resin part 25, according to the amount of the UV light used for the exposure. This restrains a production-error attributed variation in the length of the ejection surface exposed from the nickel plating film 5; i.e., the distance from the ejection opening 10 to the nickel plating film 5. Accordingly, it is possible to prevent the following problems: a problem of a foreign material caught by the corner of the nickel plating film 5 interrupting ink ejection from the nozzle hole 3, which is attributed to too short a distance between the nickel plating film 5 and the ejection opening 10; and a problem of the wiper touching the water-repellent film 8 on the ejection surface 1*a*, and damaging the circumference of the ejection opening 10, which is attributed to too long a distance between the nickel plating film 5 and the ejection opening 10.

<Embodiment 2>

Next, the following describes a method of manufacturing a nozzle plate according to Embodiment 2 of the present invention. The method of the present embodiment for manufacturing a nozzle plate is the same as Embodiment 1, except for the steps after the FIG. 3F. Accordingly, the following describes the steps after the FIG. 3F, with further reference to FIG. 4A to FIG. 4E. FIGS. 4A to 4E are cross sectional views sequentially showing the steps of a method of manufacturing a nozzle plate according to the present embodiment.

Figure 4A:
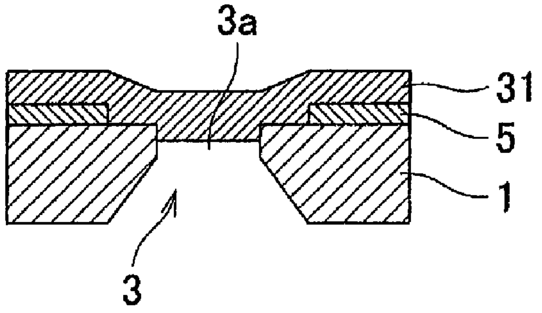
FIGS. 4A to 4E are cross sectional views sequentially showing the steps of a method of manufacturing a nozzle plate according to Embodiment 2 of the present invention.

First, as shown in FIG. 4A, a film of photocurable resin 31 serving as a resist is press fit, while applying a heat, on the top surface of the a nickel plated film 5. Then, the heating temperature, pressure, and roller speed are adjusted, and a predetermined amount of the photocurable resin 31 is injected into a cylindrical part 3*a* which is the leading end part of a through hole 7 and a nozzle hole 3 (second photocurable resin injection step). In this step, an ejection surface 1*a* exposed from the nickel plating film 5 is coated with the photocurable resin 31.

Figure 4B:
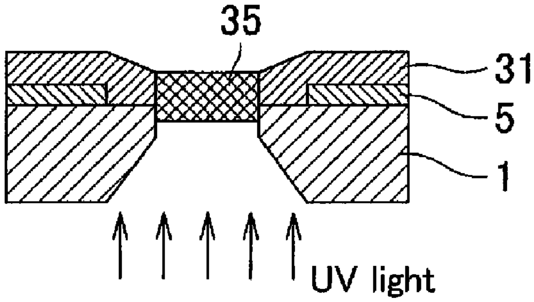

Next, as shown in FIG. 4B, ultraviolet (UV) light is applied to the nozzle plate 1 in a direction from a connection plane 1*b* to the ejection surface 1*a*. In this step, there is cured the photocurable resin 31 within an area that overlaps the cylindrical part 3*a* of the nozzle hole 3 in the axial direction of the nozzle hole 3; i.e., the photocurable resin 31 within an area that overlaps the ejection opening 10 (a second curing step). In this way, a portion of the photocurable resin 31 within an area extended from above the cylindrical part 3*a* to the inside of the cylindrical part 3*a* over the ejection surface 1*a* is cured so as to form a cylindrical cured resin part 35 having the same diameter as the ejection opening 10. By curing the portion of the photocurable resin 31 within the area extended from above the cylindrical part 3*a* to the inside of the cylindrical part 3*a* over the ejection surface 1*a*, the portion of the photocurable resin 31 forms a part projecting from the ejection surface 1*a*. In short, the cured resin part 35 includes the part projecting from the ejection surface 1*a* (hereinafter, projecting part) and the part inside the nozzle hole.

The outer diameter of the cured resin part 35 inside the nozzle hole varies within a range that does not exceed the diameter of the cylindrical part 3*a*; i.e., the diameter of the ejection opening 10, according to the amount of the UV light applied to the nozzle plate 130. Further, the outer diameter of the projecting part may be less than the diameter of the ejection opening 10 or larger than the same, according to the amount of the UV light applied to the nozzle plate 130. In the present embodiment, the outer diameter of the cured resin part 35 inside the nozzle hole equals the diameter of the ejection opening 10. In other words, the cured resin part 35 inside the nozzle hole blocks the nozzle hole 3 while covering an area of the inner wall surface of the nozzle hole 3 which continuously leads to the ejection surface 1*a* (i.e., in the present embodiment, approximately upper half area of the inner wall surface of the cylindrical part 3*a*). Further, the outer diameter of the projected part is the same as that of the ejection opening 10.

Further, in the present embodiment, the amount of light for exposure is reduced to an amount smaller than an amount for completely curing the photocurable resin 31 so as to bring the cured resin part 35 into a half-cured state which is an intermediate state of the curing reaction. During this half-cured state, the cured resin part 35 has slight flexibility and viscosity. Therefore, the side surface of the cured resin part 35 inside the nozzle hole adheres on the inner wall surface of the nozzle hole 3. Where an amount of light needed to completely cure the photocurable resin 31 is 100, it is preferable to set the amount of light applied to the photocurable resin 31 within a range of 20 to 50, to form the cured resin part 35 in the half-cured state. Note that this amount of light for exposure is expressed as a product of light intensity and the duration of irradiation, and therefore controlling one of them will allow adjustment of the exposure amount.

Figure 4C:
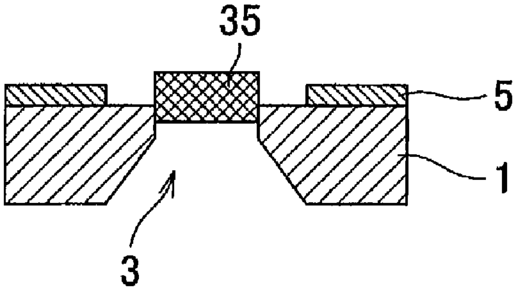

Next, as shown in FIG. 4C, the uncured photocurable resin 31 on the nickel plated film 5 and the ejection surface 1*a* of the nozzle plate 1 is removed with a developing liquid; e.g., an alkali developing liquid containing a 1% $Na_2CO_3$ solution (first uncured resin removing step). Thus, uncured photocurable resin 31 is removed, and only the cured resin part 35 remains on the nozzle plate 1.

Figure 4D:
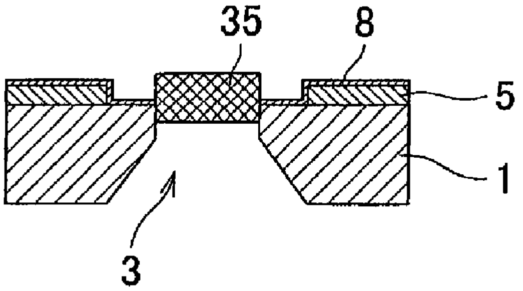

After that, as shown in FIG. 4D, a water-repellent film 8 is formed through a plating method on the surface (top and side surfaces) of the nickel plating film 5 and the region of the ejection surface 1*a* which is exposed from the nickel plating film 5 (water-repellent film formation step). Since the cured resin part 35 is a non-metal substance, the water-repellent film 8 is hardly formed on the cured resin part 35. Note that the water-repellent film 8 may be formed either by means of an electrolytic plating method or an electroless plating method.

Figure 4E:
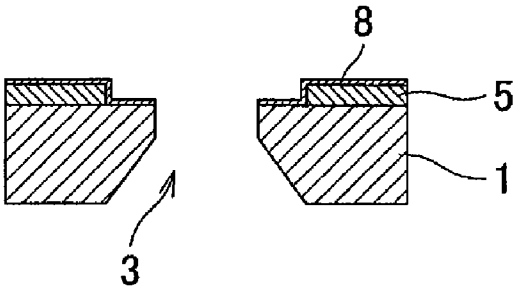

Subsequently, as shown in FIG. 4E, a peeling liquid which is a 3% NaOH solution is used to dissolve the cured resin part 35, and to remove the same from the nozzle plate 1 (cured resin removing step). Thus, a nozzle plate as shown in FIG. 1 and FIG. 2 having different levels formed around the ejection opening 10 is completed.

The present embodiment also yields aforementioned advantageous effect that manufacturing of a nozzle plate having different levels around the ejection opening 10 thereof is possible without a need of separately preparing a member such as a photomask which takes a lot of work and time to be manufactured.

Further, in the present embodiment, the water-repellent film 8 is formed using the columnar resin part 35 which is partially inside the nozzle hole 3 as a mask. Therefore, the water-repellent film is not formed inside the nozzle hole 3. This yields even shape of the meniscus, and an improved ink ejection characteristic.

The following alternative examples of the present embodiment is possible. Namely, the water-repellent film formation step may be a step for forming the water-repellent film 8 by means of aforementioned PVD (Physical Vapor Deposition) method. In this case, the water-repellent film 8 is also formed on the top surface of the cured resin part 35 with approximately the same thickness as the other part of the water-repellent film 8. However, the water-repellent film 8 will not grow on the side surface of the cured resin part 35. This is attributed to the characteristic of the vapor particles constituting the water-repellent film 8, which travels very straight. Accordingly, the water-repellent film on the cured resin part 35 is easily removed along with the cured resin part 35 in the subsequent cured resin removing step.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method of manufacturing a nozzle plate having thereon a nozzle hole for ejecting a liquid, comprising:

a step for forming, on a plate to become the nozzle plate, the nozzle hole which penetrates the plate in the thickness direction;

a first photocurable resin injection step for (i) coating with a photocurable resin a first surface of the plate on which a first opening to serve as an ejection opening of the nozzle hole is formed, and (ii) injecting the photocurable resin into an area inside the nozzle hole which area continuously leads to the first opening;

a first curing step for applying light to the plate in a direction from a second surface provided with a second opening of the nozzle hole to the first surface, so as to form a first cured resin part including a columnar part which is a cured portion of the photocurable resin within an area that overlaps the first opening along the direction from the second surface to the first surface and an annular part which is a cured portion of the photocurable resin surrounding a part of the columnar part outside the nozzle hole;

a first uncured resin removing step, performed after first curing step, for removing an uncured portion of the photocurable resin on the first surface;

a base film formation step performed after the first uncured resin removing step, for forming a base film on the first surface in such a manner that the base film contacts and surrounds the annular part of the first cured resin part;

a cured resin removing step, performed after the base film formation step, for removing the first cured resin part; and a water-repellent film formation step, performed after the cured resin removing step, for coating with a water-repellent film a surface of the base film and a portion of the first surface of the plate exposed from the base film.

2. The method according to claim 1, wherein the water-repellent film is formed by means of vapor deposition in the water-repellent film formation step.

3. The method according to claim 1, wherein:

the water-repellent film formation step includes: (i) a second photocurable resin injecting step for coating with the photocurable resin the first surface exposed from the base film, and injecting the photocurable resin into an area inside the nozzle hole which area continuously leads to the first opening; (ii) a second curing step for applying the light to the plate in the direction from the second surface to the first surface, so as to form a columnar second cured resin part which is a cured portion of the photocurable resin within a range that overlaps the first opening along the direction from the second surface to the first surface, and (iii) a second uncured resin removing step, performed after the second curing step, for removing an uncured portion of the photocurable resin on the first surface; and the water-repellent film is formed, using the second cured resin part as a mask, on the base film and the first surface of the plate exposed from the base film.

* * * * *